United States Patent [19]

Barkes

[11] Patent Number: 5,611,462
[45] Date of Patent: *Mar. 18, 1997

[54] AIRCRAFT CLEANING APPARATUS AND MIXING VALVE THEREFOR

[75] Inventor: Jeffrey C. Barkes, Jonesboro, Ga.

[73] Assignee: Pure Corporation, Indianapolis, Ind.

[ * ] Notice: The term of this patent shall not extend beyond the expiration date of Pat. No. 5,477,884.

[21] Appl. No.: 392,098

[22] Filed: Feb. 22, 1995

Related U.S. Application Data

[63] Continuation-in-part of Ser. No. 188,100, Jan. 28, 1994, Pat. No. 5,477,884.

[51] Int. Cl.⁶ .............................. B67D 5/60; F16K 11/02
[52] U.S. Cl. .................... 222/134; 137/625.41; 137/607; 222/135; 222/145.4; 222/145.7; 222/189.11; 222/608; 251/120
[58] Field of Search .................................. 222/134, 135, 222/608, 145.1, 145.7, 145.8, 145.4, 189.11, 189.06; 137/625.41, 607, 625.46; 251/120

[56] References Cited

U.S. PATENT DOCUMENTS

| | | | |
|---|---|---|---|
| 1,896,092 | 2/1933 | Mangiameli | 137/625.41 X |
| 2,809,663 | 10/1957 | Farwick | 137/625.41 |
| 2,997,209 | 8/1961 | Daniele | 222/134 X |
| 3,223,040 | 12/1965 | Dinkelkamp | 222/134 X |
| 3,638,837 | 2/1972 | Fullerton | 222/135 X |
| 3,865,308 | 2/1975 | Pringle et al. | 222/134 X |
| 3,910,462 | 10/1975 | Abeles et al. | 222/135 |
| 4,087,967 | 5/1978 | Knapp | 60/392 |
| 4,113,182 | 9/1978 | Brago | 222/134 X |
| 4,154,368 | 5/1979 | Gusmer et al. | 222/135 |
| 4,726,526 | 2/1988 | Ostergaard | 239/318 |
| 4,773,113 | 9/1988 | Russell | 15/4 |
| 4,967,960 | 11/1990 | Futrell | 239/148 |
| 4,991,776 | 2/1991 | Smith | 239/302 |
| 5,057,214 | 10/1991 | Morris | 210/136 |
| 5,069,245 | 12/1991 | Potter | 137/218 |
| 5,161,753 | 11/1992 | Vice et al. | 244/134 |
| 5,234,268 | 8/1993 | Homan | 222/134 X |
| 5,273,059 | 12/1993 | Gross et al. | 134/57 |
| 5,477,884 | 12/1995 | Barkes | 137/625.41 |

FOREIGN PATENT DOCUMENTS 0744066 2/1956 United Kingdom.

OTHER PUBLICATIONS

McCullough, "Inventor Hits Paydirt With Machine: Airplane Washer A Hit With Industry", *Clayton News Daily*, 14 Apr. 1993.
"Mechanics Invention Takes Off" *Macon Daily Telegraph*, 16 Apr. 1993.
"The Man With A Plan" *ATL Baseline*, May, 1993.
"Mechanic's Invention Works Up A Lather, Gets DC-9's Squeaky Clean", *Northwest Airlines Passages*, 19 Jul. 1993.

*Primary Examiner*—Kevin P. Shaver
*Attorney, Agent, or Firm*—Bose McKinney & Evans

[57] ABSTRACT

A portable cleaning device dispenses at least a first cleaning fluid and a second cleaning fluid. The device includes at least two user controllable fluid dispensing devices, a frame means, a first fluid reservoir for holding the first cleaning fluid, a first pump for pumping the first cleaning fluid from the first reservoir, and a first manifold for receiving the first cleaning fluid from the first pump, and distributing it to a first line set comprising a plurality of lines. The lines deliver the first cleaning fluid to the fluid dispensing devices. A second fluid reservoir holds a second cleaning fluid, such as water, and delivers it to a second pump which pumps the second cleaning fluid to a second manifold. The second manifold includes a plurality of exit ports for distributing the second fluid to a plurality of second lines which deliver the second cleaning fluid to the fluid dispensing devices. The dispensing devices each include a mixing valve for receiving one line from each of the first and second line sets, and permit the user to controllably adjust the relative volumes of the first and second cleaning fluids dispensed by the dispensing devices.

36 Claims, 9 Drawing Sheets

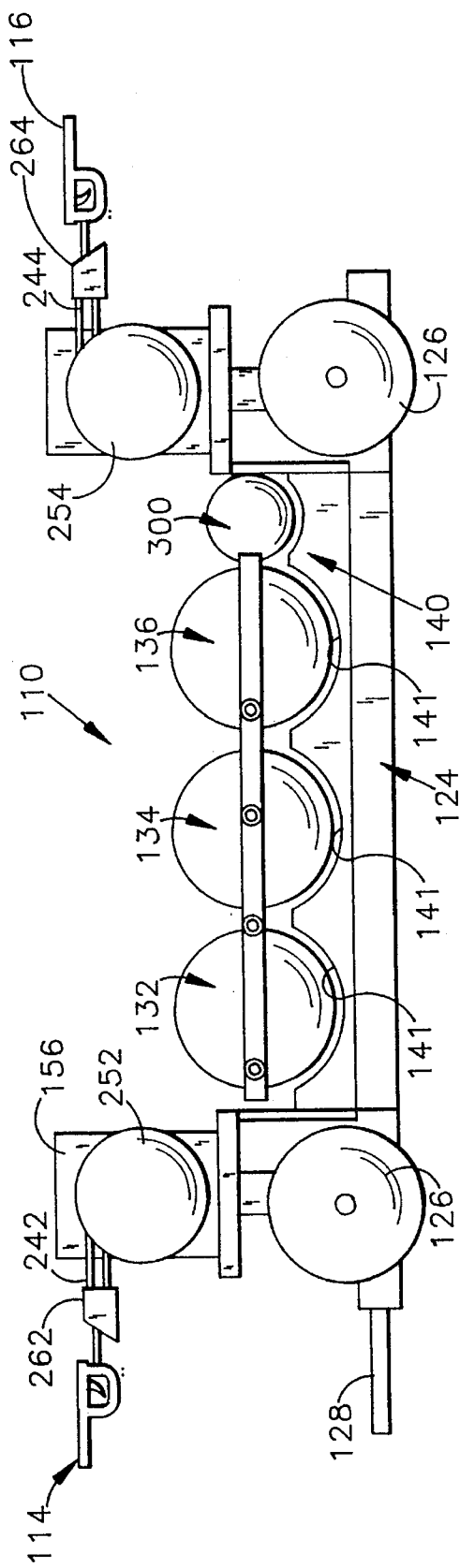
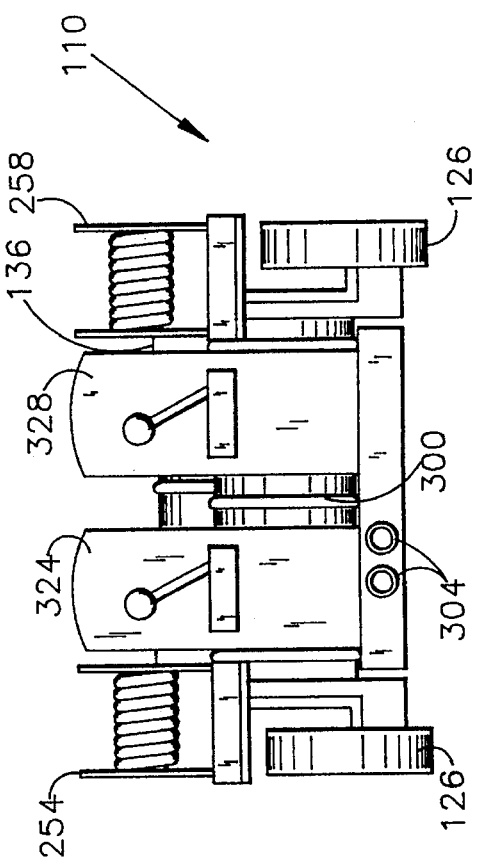
FIG. 7
FIG. 8

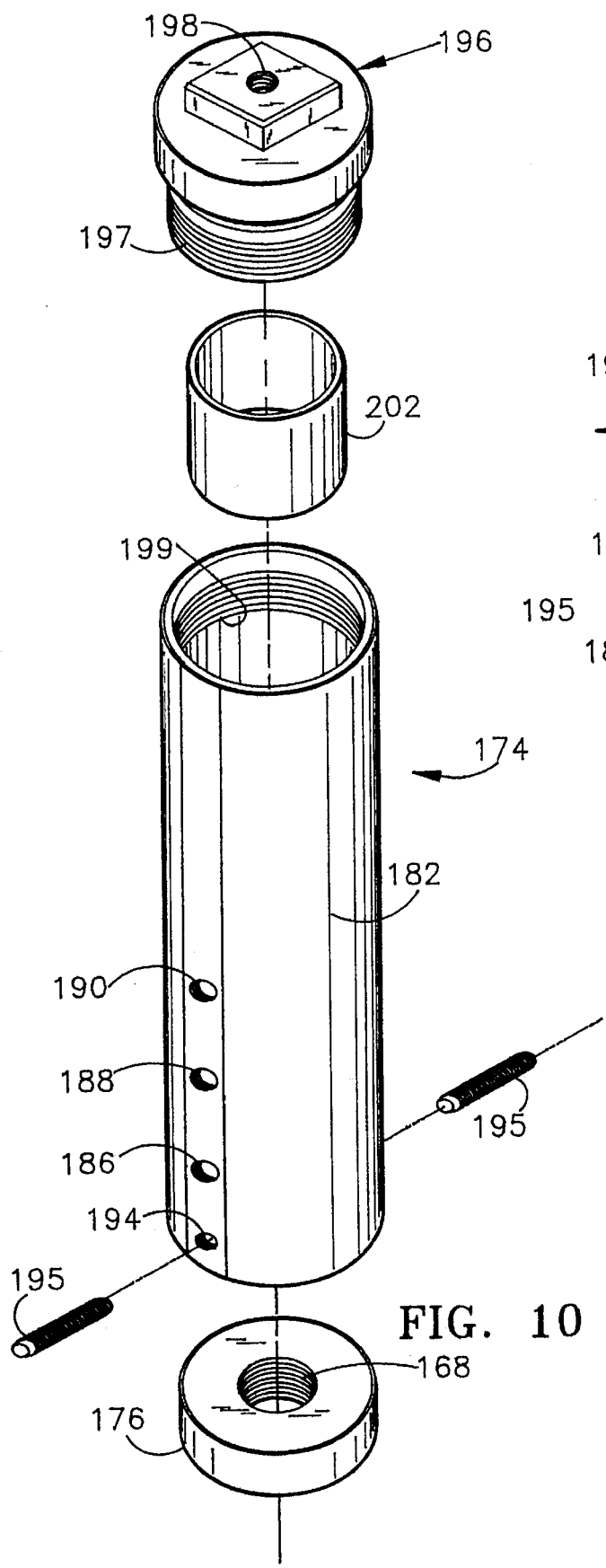
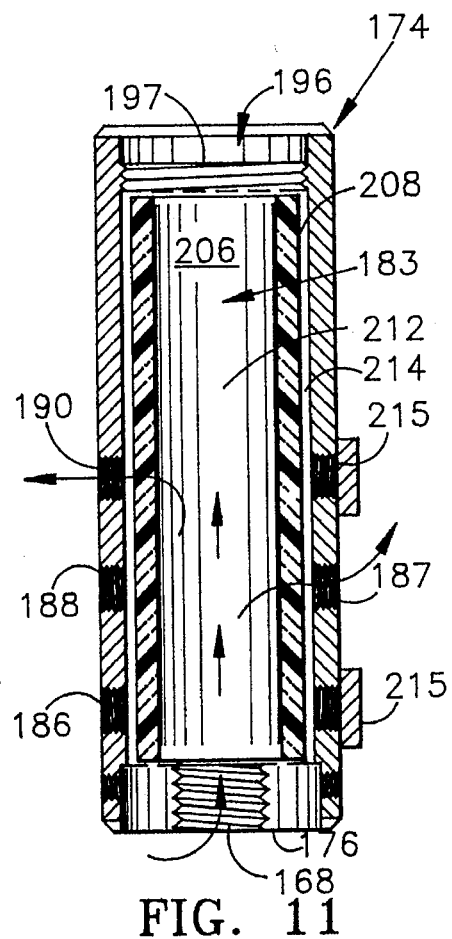
FIG. 10
FIG. 11

AIRCRAFT CLEANING APPARATUS AND MIXING VALVE THEREFOR

PRIOR HISTORY

The instant application is a continuation-in-part of Jeffrey C. Barkes U.S. patent application, Ser. No. 08/188,100, which was filed on 28 Jan. 1994, which has matured on 26 Dec. 1995 into U.S. Pat. No. 5,477,884.

TECHNICAL FIELD OF THE INVENTION

The present invention relates to portable cleaning devices, and more particularly to a portable cleaning device especially adapted for use in cleaning aircraft. Additionally, the present invention relates to mixing valves for use on such cleaning devices that are capable of combining fluids from two separate sources in variable proportions to form a mixture.

BACKGROUND OF THE INVENTION

Pressurized cleaning devices are well known and take many different forms. For example, a garden hose connected to a typical household faucet may be used to provide a source of pressurized "tap" water for a variety of cleaning needs. In other applications, such as a public car wash, a mechanism is provided for selecting pressurized water only, or a predetermined mixture of pressurized water and a concentrate such as soap or wax. A smaller vehicle cleaning system that operates on this principal is disclosed in Futrell U.S. Pat. No. 4,967,960. Likewise, a drain cleaning apparatus operating in this manner is disclosed in Russell U.S. Pat. No. 4,773,113. A larger system employing this principal for cleaning commercial aircraft is disclosed in Vice et al. U.S. Pat. No. 5,161,753.

In many of the cleaning devices described above, some types of valves are employed to allow one fluid to intermix with another fluid, thereby providing a solution of predetermined concentration. Such a system using an aspirator-transfer valve is shown in Ostergaard U.S. Pat. No. 4,726, 526. Other valve configurations, such as that shown in Potter U.S. Pat. No. 5,069,245, permit the mixing together of two liquids according to plurality of predetermined proportion settings.

In the commercial airline industry, aircraft are typically cleaned extensively on a yearly basis by "teams" of airline employees. Such a task usually involves the use of a variety of cleaning agents and bulky cleaning machinery. It would therefore be desirable to provide a stand-alone cleaning apparatus that would allow multiple users to accomplish specific cleaning tasks without disrupting the other members of the team. It would further be desirable to provide each user with complete control over the strength of the particular cleaning solution being used. Such a system must therefore be capable of providing a constant pressure cleaning solution to each user wherein the cleaning agent to water ratio is continuously adjustable.

Another desirable feature of an airplane cleaning apparatus is that it be portable, so that the device can be taken to a plane, rather than requiring the plane to travel to it. This desirability is especially because hangar space is usually at a premium at maintenance facilities, and airplanes undergoing extensive renovation are usually somewhat immobilized within a repair bay during the performance of the maintenance.

Additionally, a portable cleaning apparatus should be configured to comport with typical airplane sizes and dimensions. One of the more important dimensions of an airplane relates to the clearance between the bottom surface of the wing and fuselage and the ground. Preferably, a portable cleaning apparatus should be sized so that it can be rolled under the fuselage of larger airplanes (such as 747's) so that both sides of the airplane can be cleaned effectively by the device.

Another desirable feature of an aircraft cleaning device is that it be designed to provide a high pressure source of cleaning fluid and water to a user controllable fluid dispensing device, such as a wand, so that the water pressure emanating from the device can perform much of the "work" of cleaning the airplane and removing the dirt and grime from the airplane and its parts.

It is therefore one object of the present invention to provide a portable cleaning apparatus for use with aircraft, that is both efficient, and effective in the cleaning of aircraft.

SUMMARY OF THE INVENTION

In accordance with the present invention, a portable cleaning device is provided for dispensing at least a first cleaning and a second cleaning fluid. The device comprises at least two user controllable fluid dispensing devices, a frame means, and a first fluid reservoir means supported by the frame for holding the first cleaning fluid. A first pump means is provided for pumping first cleaning fluid from the first reservoir means, and a first manifold means is provided for receiving the first cleaning fluid from the first pump means. The first manifold means includes at least one entry pod and at least two exit pods. A first line set means is provided for delivering the first cleaning fluid from the exit pods of the first manifold means to each of the user controllable fluid dispensing devices. A second fluid reservoir means holds a second cleaning fluid, and a second pump means pumps the second cleaning fluid from the second fluid reservoir means. A second manifold means receives the second cleaning fluid from the second pump means, and includes at least one entry pod and at least two exit ports. A second line set means delivers the second cleaning fluid from the exit pods of the second manifold means to each of the two user controllable fluid dispensing devices. The two user controllable dispensing devices include a mixing valve means for receiving at least one line from each of the first and second manifolds, for permitting the user to controllably adjust the relative volumes of the first and second cleaning fluids dispensed by the dispensing devices.

Preferably, the first and second manifold means each comprise a canister having a first wall on which the entry pod is disposed, and a second wall on which the at least two exit pods are disposed. The manifold includes a filter means having a generally continuous upstream surface that defines an upstream fluid passage between the entry port and the upstream surface, and a generally continuous downstream surface that defines a downstream passage between the downstream surface and the at least two exit pods.

Additionally, the second pump means preferably comprises a first and second, second pump means which are operated in parallel. A second fluid delivery line means is provided for delivering the second cleaning fluid from the second fluid reservoir to the second manifold means. The second fluid delivery line means includes a first portion for delivering the second cleaning fluid from the second reservoir means to each of the first and second, second pump means, and a second portion for delivering the second cleaning fluid from each of the first and second, second pump means to a single entry port of the second manifold means. The first and second, second pump means are preferably capable of pumping the second cleaning fluid at a pressure of at least about 1500 PSI, and preferably about 2000 PSI; and the first pump means is capable of pumping the first cleaning fluid at a pressure of at least about 1000 PSI, and preferably between about 1200 and 1400 PSI, to each of the at least two user controllable dispensing devices, In another embodiment of the present invention, a valve system is provided for combining two liquids in varying proportions. The valve system comprises a valve body having a first bore disposed therethrough, a first inlet passage defined in the valve body for receiving the first cleaning fluid, and a second inlet passage defined in the valve body for receiving the second cleaning fluid. An outlet passage is also defined in the valve body for providing a proportional mixture of the first cleaning fluid and the second cleaning fluid. A valve means is provided for directing the first cleaning fluid and the second cleaning fluid toward the outlet passage. The valve means includes a generally cylindrical second valve member disposed within the first bore for directing the second cleaning fluid toward the outlet passage. The second valve member is rotatably adjustable. A first valve member is disposed within the first bore for directing the first cleaning fluid. The rotating movement of the second valve member adjusts the volume of the second cleaning fluid that is permitted to travel toward the outlet passage by the second valve member, and causes axial movement of the first valve member to adjust the volume of the first cleaning fluid that is permitted to travel toward the outlet passage.

Preferably, the second valve member includes a cam surface for causing axial movement of the first valve member in response to rotational movement of the second valve member, and a biasing means for biasing the first valve member toward the cam surface of the second valve member.

One feature of the present invention is that both the first (soap) cleaning solution delivery system, and the second (water) cleaning solution delivery system use a pumping system disposed downstream from a reservoir, and upstream from a manifold that distributes the respective cleaning solutions to a plurality of line sets. This feature has the advantage of providing a centralized, high pressure pumping system which can distribute the fluid to a plurality of user controllable dispensing devices through a manifold system which performs the distribution functions. A further feature of the manifold of the present invention is that it can include a filter means for filtering any impurities or particulate matter within the first and second cleaning solutions. The filtering of the particulant matter is important, not only for preventing clogs within the system (and in particular, in the dispensing devices), but also in helping to prevent any damage caused by the expulsion of the particulant matter against an aircraft part.

Another feature of the present invention is that a mixing valve means is provided which is disposed generally adjacent to the user controllable dispensing device. By placing the mixing valve close to the dispensing wand, any changes made by the user cleaning fluids mixture occur much more quickly. If the mixing valve were disposed further away from the dispensing devices, a change in the cleaning fluid mixture would likely take effect more slowly, as the lines between the mixing valve and the dispensing device emptied out after the adjustment.

A further feature of the present invention is that it includes a third valve passage disposed downstream of the second inlet passage for receiving the second cleaning fluid, and a fourth passage disposed between the inlet passage for the first cleaning fluid, and the third passage. This arrangement causes the outlet passage to become a chamber, wherein the first cleaning fluid and the second cleaning fluid are mixed. Another advantage of the valve arrangement of the present invention is that the relatively higher pressure second cleaning fluid helps to draw the relatively lower pressure first cleaning fluid into the outlet passage due to the configuration of the intersection of the third and fourth passages. This feature has the advantage of facilitating the efficient mixing of the first and second cleaning fluids.

It is also a feature of the present invention that the mixing valve includes a second valve member that is rotatable to adjust the volume of the second cleaning fluid, and a first valve member that is axially moveable to adjust the volume of the first cleaning fluid. Both the rotary position of the first valve member and the axial position of the second valve member are controlled through the rotary action of a single control. The valve of the present invention also provides an infinitely variable proportion of first cleaning fluid and second cleaning fluid to be dispensed, while being remarkably durable, and resistant to leaks. These and other features of the present invention will become apparent to those skilled in the art upon consideration of the detailed description and drawings as discussed below.

BRIEF DESCRIPTION OF THE DRAWINGS

FIG. 4 is a bottom plan view of the valve body shown in FIG. 1a.

FIG. 7 is a side view of the aircraft cleaning apparatus of the present invention;

FIG. 8 is a rear view of the aircraft cleaning apparatus of the present invention;

FIG. 10 is a perspective, exploded view of the fluid manifold of the present invention;

FIG. 11 is a sectional view of the body of the manifold canister;

DESCRIPTION OF THE PREFERRED EMBODIMENT

Figure 1:
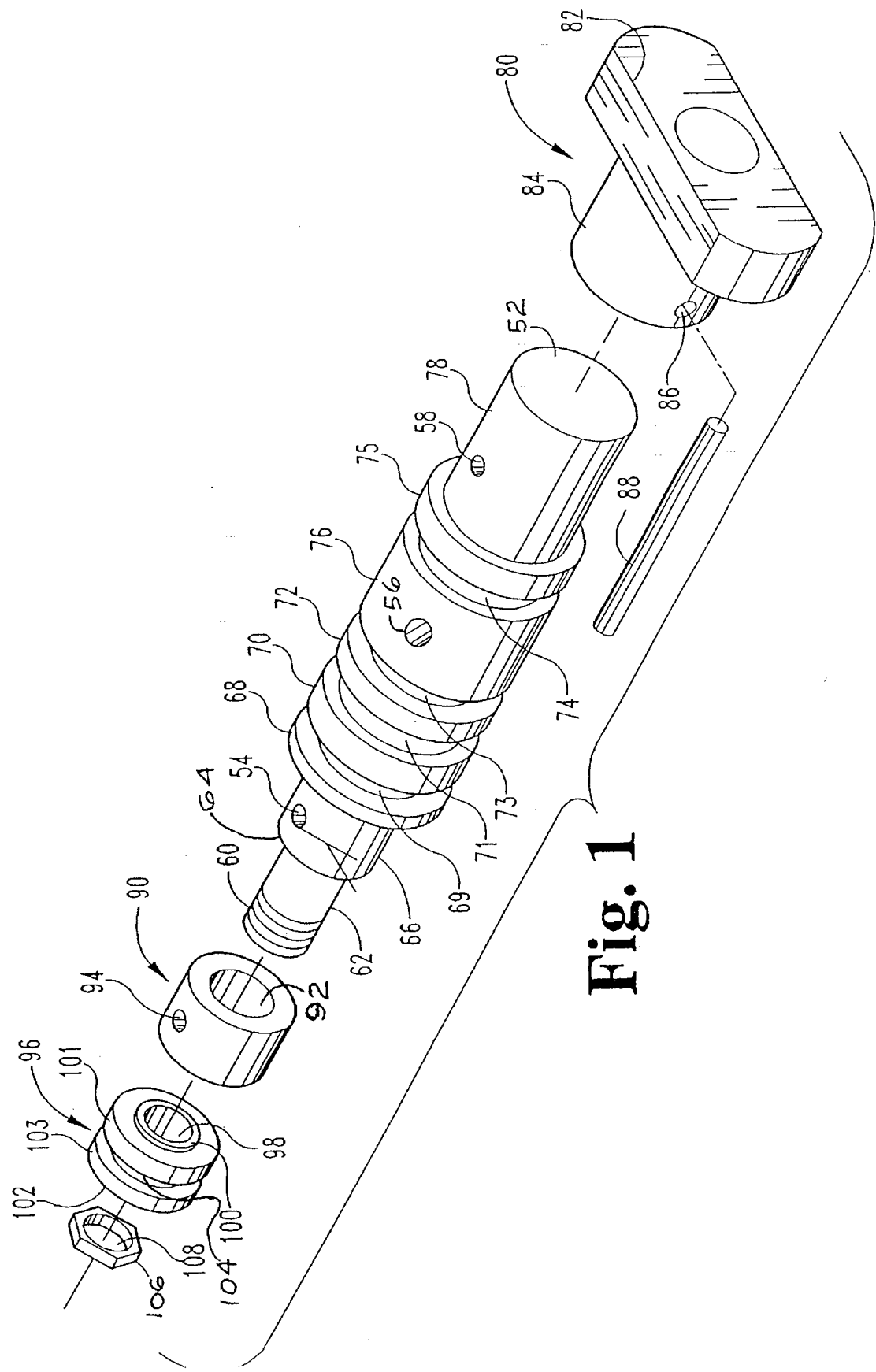
FIG. 1 is an exploded view of a spool valve and its various valve components, in accordance with the present invention.
Figure 1A:
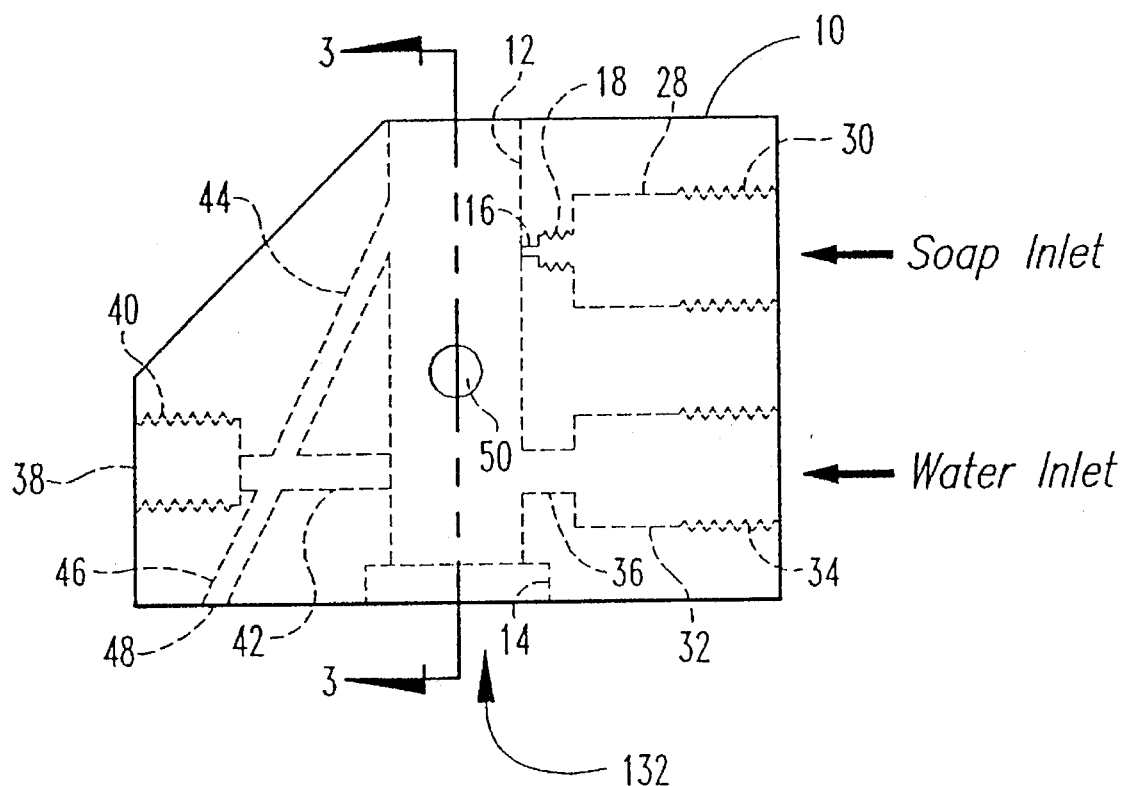
FIG. 1a is a left side plan view of a valve body in accordance with the present invention, showing internal fluid paths in phantom.

Referring to FIGS. 1 and 1a, the various components of valve system 5 are shown. Valve body 10 defines a bore 12 therethrough having a predetermined bore diameter. One end of bore 12 terminates at the top surface of body 10 and the other end terminates at one end of a second bore 14 having a bore diameter larger than that of bore 12. The opposite end of bore 14 terminates at the bottom surface of body 10.

Figure 3:
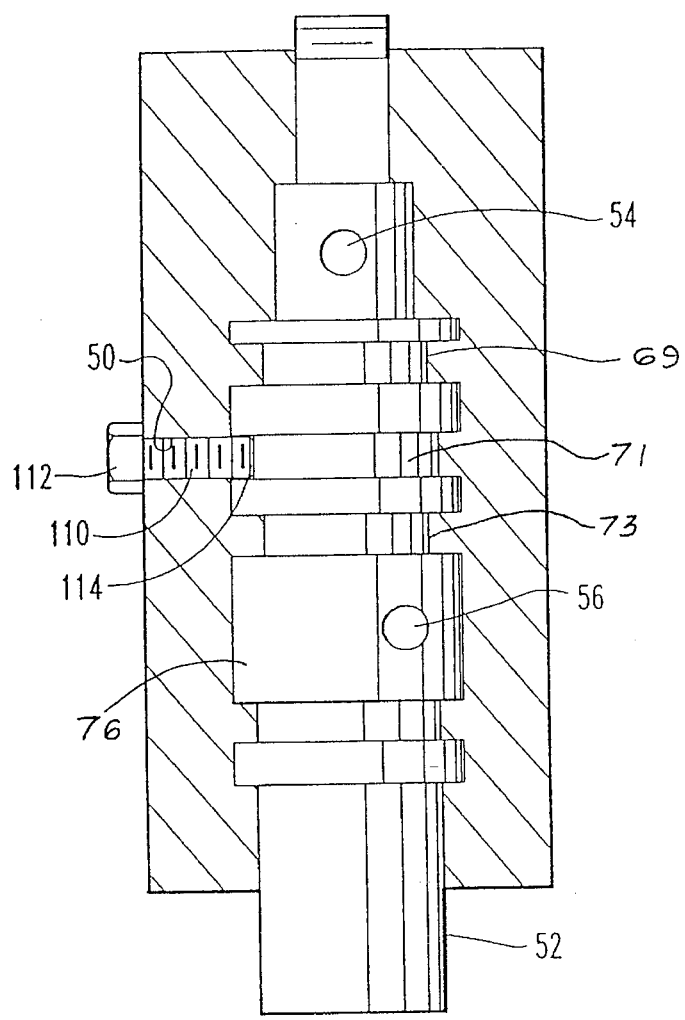
FIG. 3 is a rear cross-sectional view, along lines 3—3 of the valve body shown in FIG. 1a, wherein a mechanism for restraining translational movement of a spool valve disposed within the valve body is shown.

Body 10 further defines a first inlet passage 28 having a threaded portion 30 at one end for connecting to a source of soap solution (not shown). In one embodiment, soap solution is supplied at between approximately 1200 and 1400 PSI. At the opposite end of the first inlet passage 28, body 10 defines a second threaded passage 18 for receiving a complementarily threaded flow restricting device 20 (FIG. 3). Threaded passage 18 is open to bore 12 via passage 16 disposed generally perpendicular to bore 12.

Figure 2:
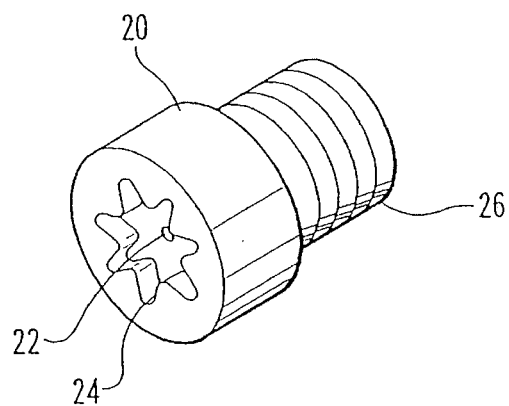
FIG. 2 is a perspective view of a flow restricting device for use in the valve system of the present invention.

Referring now to FIG. 2, flow restricting device 20 has a threaded portion 26 and a flow restricting bore 22 disposed therethrough for reducing the flow rate of fluid from inlet passage 28 to passage 16. In one embodiment, device 20 is a screw made from, for example 316 stainless steel, and has a torques-type head 24 with a bore 22 approximately 0.052 inches in diameter extending axially from the center of the torques receptacle 24 to the end of the screw.

Referring back to FIGS. 1 and 1a, body 10 also defines a second inlet passage 32 having a threaded portion 34 at one end for connecting to a source of water (not shown). In one embodiment, water is supplied at approximately 2000 PSI. The opposite end of the second inlet passage 32 is open to bore 12 via a passage 36, that is disposed generally perpendicular to bore 12. In one embodiment, the first and second inlet passages 28 and 32 are sized, and threaded portions 30 and 34 are configured, for receiving a complementarily threaded 0.375 inch pipe, and passage 18 is configured to receive the threaded portion 26 of a 0.25 inch 28 tpi flow restricting device 20. Although not shown, passage 36 can be configured similarly to passage 18 for accepting a flow restrictor device similar to flow restricting device 20.

Body 10 further defines an outlet passage having a threaded portion 40 for connecting, in one embodiment, to a 0.375 inch complementarily threaded pipe. Outlet passage 38 is open to bore 12 via third passage 42 disposed generally perpendicular to bore 12 and directly opposite to and facing second inlet passage 36. Third passage 42 is further open to bore 12 via a fourth passage 44 disposed at an acute angle relative to the longitudinal axis of bore 12. Third passage 42 is also open to passage 46 which is a continuance of fourth passage 44 toward the bottom of body 10. Passage 46 is non-functional with respect to the operation of valve system 5 and exists only to provide a path for drilling fourth passage 44 during the manufacture of body 10. In fact, after fourth passage 44 is formed, passage 46 is typically closed at opening 48 by welding or any other equivalent method of forming leak-proof seal.

Finally, body 10 defines a threaded hole 50 extending through the side of body 10 and into bore 12 for receiving retaining screw 110 (FIG. 3). In one embodiment, hole 50 is configured to receive a 0.25 inch 18 tpi retaining screw 110.

Body 10 is preferably of uniform construction and made from, for example, a material such as 304 stainless steel.

Elongated valve member 52 is intended by the present invention to be received within bore 12 as shown by arrow 132 in FIG. 1a, for directing the flow of soap solution and water, in varying proportions, to outlet 38. To this end, valve 52 includes a cylindrical portion 66 having a bore 54 extending therethrough perpendicular to the longitudinal axis of valve 52. A sealing sleeve 90 has a pair of perpendicularly intersecting bores, 92 and 94, extending therethrough, wherein bore 92 is sized slightly smaller than the diameter of cylindrical portion 66 so that sleeve 90 may be forcibly retained on valve 52 by stretching bore 92 over cylindrical portion 68. Bore 94 is configured within sleeve 90 to allow substantial alignment of bores 94 and 54 when sleeve 90 is stretched over cylindrical portion 66. In order to allow such stretching, sleeve 90 is required to be somewhat elastic and is preferably made of TEFLON®.

Figure 5:
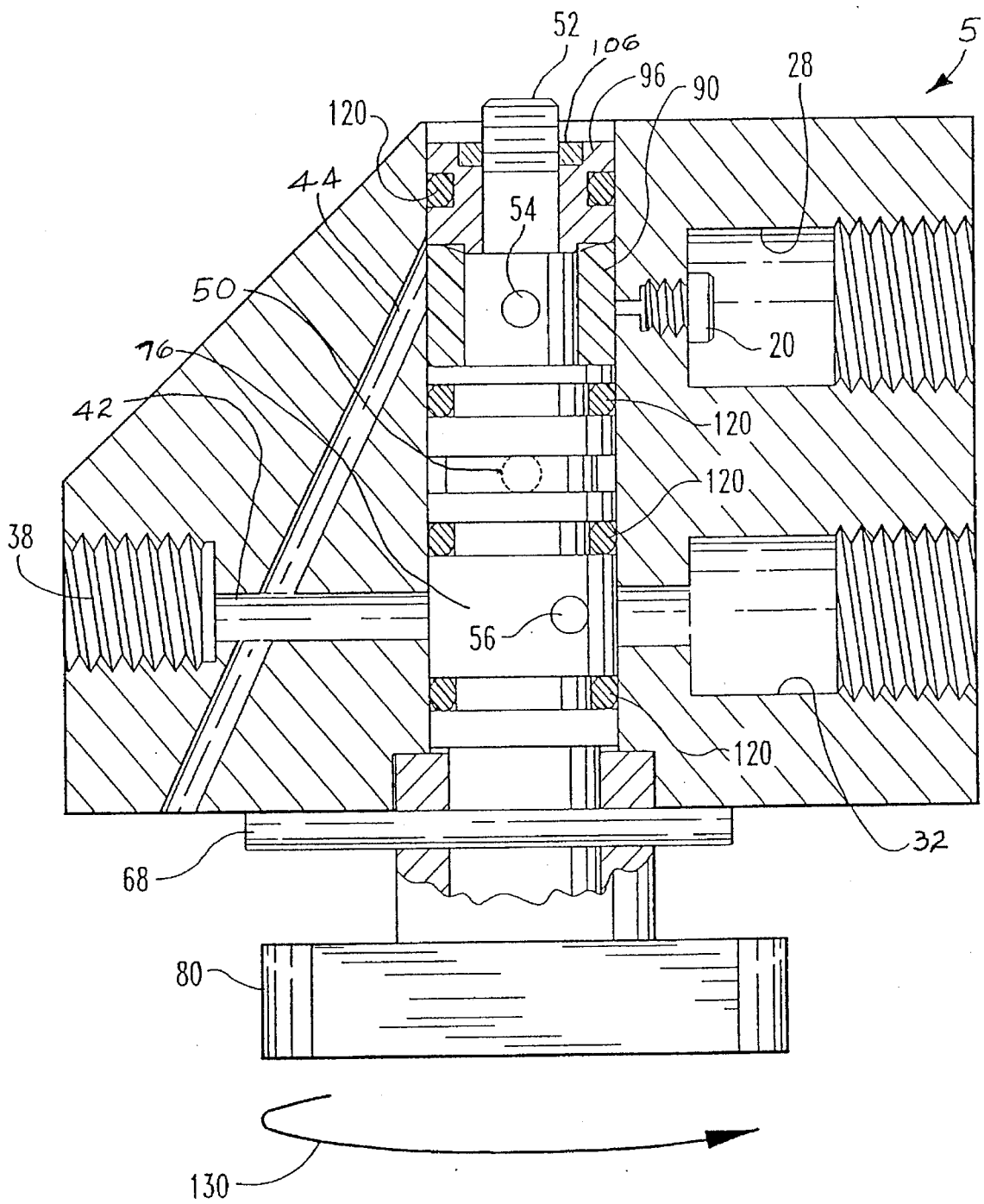
FIG. 5 is a cross-sectional view of the valve body of FIG. 1a with the valve assembly of FIG. 1 disposed therein.

Valve 52 further includes a cylindrical portion 62 adjacent to one end of cylindrical portion 66 for receiving seal carrier 96. Seal carrier 96 has a bore 98 sized to receive cylindrical portion 62 therethrough. At one end of bore 98, seal carrier 96 defines a boss 100 sized to contact a surface 64 of cylindrical portion 66. This action serves to compress sleeve 90, thereby pressing it against the walls of bore 12 when valve 52 is disposed therein. At the other end of bore 98, seal carrier 96 defines a recess sized to house a nut 106 disposed therein. A threaded portion 60 of cylindrical portion 62 defines one end of valve 52 and is configured to engage the complementarily threaded bore 108 of nut 106. Thus, when sleeve 90 is stretched onto cylindrical portion 66, and seal carrier 96 is loaded onto cylindrical portion 62 via bore 98, the threaded portion 108 of nut 106 engages the threaded portion 60 of valve 52 to thereby compress sleeve 90. Seal carrier 96 further defines a channel 104 disposed radially about bore 98 and positioned between cylindrical spools 101 and 103, also defined by seal carrier 96, for retaining a fluid seal ring 120 (FIG. 5).

Valve 52 further defines a series of consecutive cylindrical spools 68, 70, 72, 76 and 75 respectively adjacent to the end of cylindrical portion 66 opposite cylindrical portion 62. Cylindrical channels 69, 71, 73 and 74 are further defined by valve 52 and are respectively disposed between the spools 68, 70, 72, 76 and 75. Channels 69, 73 and 74 are configured identically to channel 104 for retaining a fluid seal ring 120 (FIG. 5). Channel 71, on the other hand, is configured to receive the tip 114 of a set screw 110 engaged with threaded bore 50 as shown in FIG. 3.

Referring to FIG. 3, set screw 110 is provided for restraining translational motion of the valve 82 after it is received within bore 12. The head of set screw 110 is preferably a 12 point bolt head. Set screw 110 must be long enough to extend through the valve body 10 and allow the tip 114 to bear against either the surface of cylindrical channel 71 or the two opposing faces of cylindrical spools 70 and 72.

As shown in FIGS. 1 and 3, cylindrical spool 76 defines a bore 56 extending through valve 52 perpendicular to its longitudinal axis. Bore 56 is sized identically to bore 54, with both bores 54 and 56 being preferably 0.125 inch in diameter. However, as is most clearly seen in FIG. 3, bore 56 is radially offset from bore 54. In one embodiment, the angle of offset is approximately 30 degrees.

Referring back to FIGS. 1 and 1a, the remaining end of valve 52 is defined by a cylindrical portion 78 adjacent spool 75. Cylindrical portion 78 is configured to receive a comparably sized bore (not shown) on adjustment handle 80. An outer cylindrical portion 84 of handle 80 is sized to be received within bore 14 with a predetermined loose fit so that cylindrical portion 84 may be freely rotated within bore 14. A bore 86 extends through cylindrical portion 84 perpendicular to its longitudinal axis and a pin 88 is provided which extends through bore 86 and bore 58, when handle 80 is fitted over cylindrical portion 78, thereby locking handle 80 to valve 52. Handle 80 further includes a gripping portion 82 for manually adjusting valve 52.

Spools 68, 70, 72, 76, 75, 101 and 103 are generally sized identically to each other and are slidably received within bore 12 when the valve 52, handle 80, sleeve 90, seal carrier 96 and nut 106 construct is disposed within bores 12 and 14.

Figure 4:
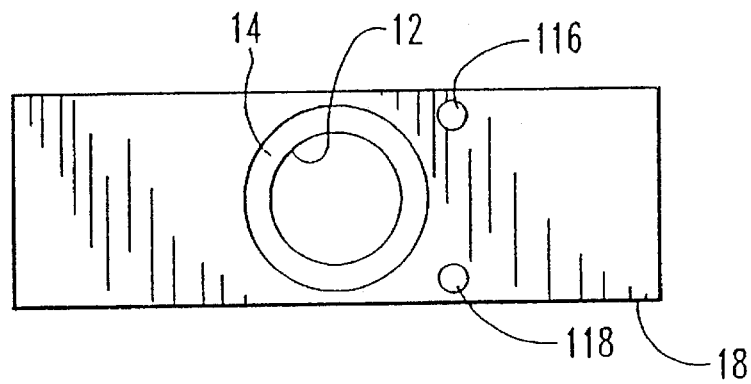

Referring to FIG. 4, the bottom of valve body 10 includes stops 116 and 118 for restraining rotational motion of valve 52 disposed within bore 12. When valve system 5 is constructed from the various components shown in FIG. 1, the pin 88 is longer than the outer diameter of cylindrical portion 84 and should extend between the stops 116 and 118. Because pin 88 is secured to handle 80 and valve 52, stops 116 and 118 only allow rotational motion of the valve 52 within bore 12 to the extent that pin 88 is free to move between stops 116 and 118.

Referring to FIG. 5, the operation of valve system 5 will now be described. With the spool valve assembly of FIG. 1 inserted into bore 12 as previously described, bore 54 is positioned at the same longitudinal position as the radially inner ends of first inlet passage 16 and fourth passage 44. Similarly, bore 56 is positioned at the same longitudinal position as the radially inner end of the second inlet passage 36, and third passage 42. Fluid seal rings 120 have been positioned within channels 69, 73, 74 and 104 as previously described to retain soap solution in the vicinity of bore 54 and water in the vicinity of bore 56, thereby preventing commingling of the two fluid sources within bore 12 and further preventing leakage of the two fluids out of bore 12 and valve body 10. Fluid seal rings 120 must be capable of forming an acceptable fluid seal and must further be resistant to chemicals such as detergents and solvents that may be present in the soap solution. In one embodiment, the fluid seal rings 120 are VITON® "O" rings.

Since bore 54 is radially offset with respect to bore 56 as previously described, rotational movement of valve 52 via handle 80 will result in differing proportional mixtures of soap solution and water emerging from outlet passage 38. When handle 80 is positioned such that bore 56 is axially aligned with passages 36 and 42, so that bore 56, passage 36 and passage 42 are disposed coaxially, water entering second inlet passage 32 flows through second inlet passage 32, bore 56, third passage 42 and through outlet passage 38. Because bore 84 is offset with respect to bore 56, soap solution entering passage 16 does not flow through bore 56, but is instead sealed from bore 12 via sleeve 90. With valve 82 so positioned, the mixture emerging from outlet passage 38 comprises approximately 100% water and 0% soap solution.

As handle 80 is rotated in the direction of arrow 130, bore 56 begins to move out of "axial alignment" with passages 36 and 42, thereby decreasing the flow of water into outlet 38. At the same time, bore 54 begins to move closer toward axial alignment with passages 16 and 44. As used herein, bore 54 is in "axial alignment" with passages 16 and 44 when one end of the bore 54 is disposed adjacent to the radially inner end of passage 16, and the other end of the bore 54 is disposed adjacent to the radially inner end of passage 44. As bore 54 moves closer to "axial alignment," some soap solution passes through inlet passage 28, flow control device 20, passage 16, bore 56 and into diagonal fourth passage 44. The water flowing through third passage 42 and into outlet passage 28 then draws the soap solution from fourth passage 44 and mixes the two fluids in venturi-like fashion to provide a mixture emerging from outlet passage 38 comprising somewhat less than 100% water and somewhat more than 0% soap solution.

As handle 80 continues to rotate in the direction of arrow 130, a position is reached wherein the amount of soap solution flowing through bore 54 and into fourth passage 44 is equal to the amount of water flowing through bore 56 and into third passage 42. This condition thus provides for a mixture emerging from outlet passage 38 of approximately 50% soap solution and 50% water. It can be appreciated that because the water pressure at the water (second) inlet passage 32 is greater than the soap solution pressure at the first inlet passage 28, there exists the possibility that water may back flow through fourth passage 44, bore 54, passage 16, flow control device 20, first inlet passage 28 and into the source of soap solution (not shown). To avoid possible contamination of the soap solution source, a check ball valve (not shown), or similar mechanism, may be installed within inlet chamber 28 so that back flow of water into the soap solution source can be inhibited. In situations where soap solution may back flow into the water source, a check ball valve, or similar mechanism, may also be installed within inlet chamber 32 to inhibit such back flow.

As handle 80 continues to rotate in the direction of arrow 130, a position will be reached wherein bore 54 will be axially aligned with passages 16 and 44, and bore 56, because of its offset with respect to bore 54, will not be in fluid communication with either passage 36 or passage 42. This condition thus results in a mixture emerging from outlet passage 38 of approximately 0% water and 100% soap solution. In one embodiment, some water flowing into second inlet passage 32 will flow into outlet passage 38 via third passage 42 because the diameter of cylindrical portion 76 is sized to be slightly less than the diameter of bore 12 to allow valve 52 to be slidably received therein. Some water will thus be able to flow around cylindrical portion 76 and into third passage 42 thereby decreasing the proportion of mixture emerging from outlet passage 38 to somewhat more than 0% water and somewhat less than 100% soap solution. However, the present invention contemplates the engagement of a sleeve, such as sleeve 90, to cylindrical portion 76 to thereby inhibit the flow of water into passage 42 when fluid communication from passage 36 to passage 42 through bore 56 is disallowed.

From the foregoing, it can be appreciated that the valve system 5 of the present invention allows continuous analog control of the proportional quantities of soap solution and water emerging from outlet passage 38 from approximately 0% water, 100% soap solution, to 100% water, 0% soap solution. Two mechanisms inherent in the design of valve system 5 also make it possible to operate multiple identical valve systems from a common soap solution source and common water source without adversely affecting the fluid pressure required by each user. First, flow reducing device 20 significantly reduces the flow rate of soap solution entering passage 16 from that entering inlet passage 28. Similarly, the size of bore 56 significantly reduces the flow rate of water entering passage 42 from that entering inlet passage 32. This mechanism results in allowing a user to operate valve system 5 within the aforementioned extremes while maintaining essentially constant fluid pressures at inlets 28 and 32. Second, the maximum flow rate of fluid through either bore 54 or 56 occurs only when the bore is axially aligned with its respective fluid communication passages. In other words, the maximum flow rate of water through bore 56 occurs only when bore 56 is axially aligned with passages 36 and 42, and the maximum flow rate of soap solution through bore 54 occurs only when bore 54 is axially aligned with passages 16 and 44. Thus, as valve 52 is rotated so that either bore 54 or 56 is moved away from axial alignment with its respective passages, the flow rate of fluid therethrough is diminished. This then results in less fluid demand from the respective fluid source and further acts to maintain constant fluid pressures at inlet passages 28 and 32.

The portable cleaning device 110 of the present invention is best shown in FIGS. 6–11.

Figure 6:
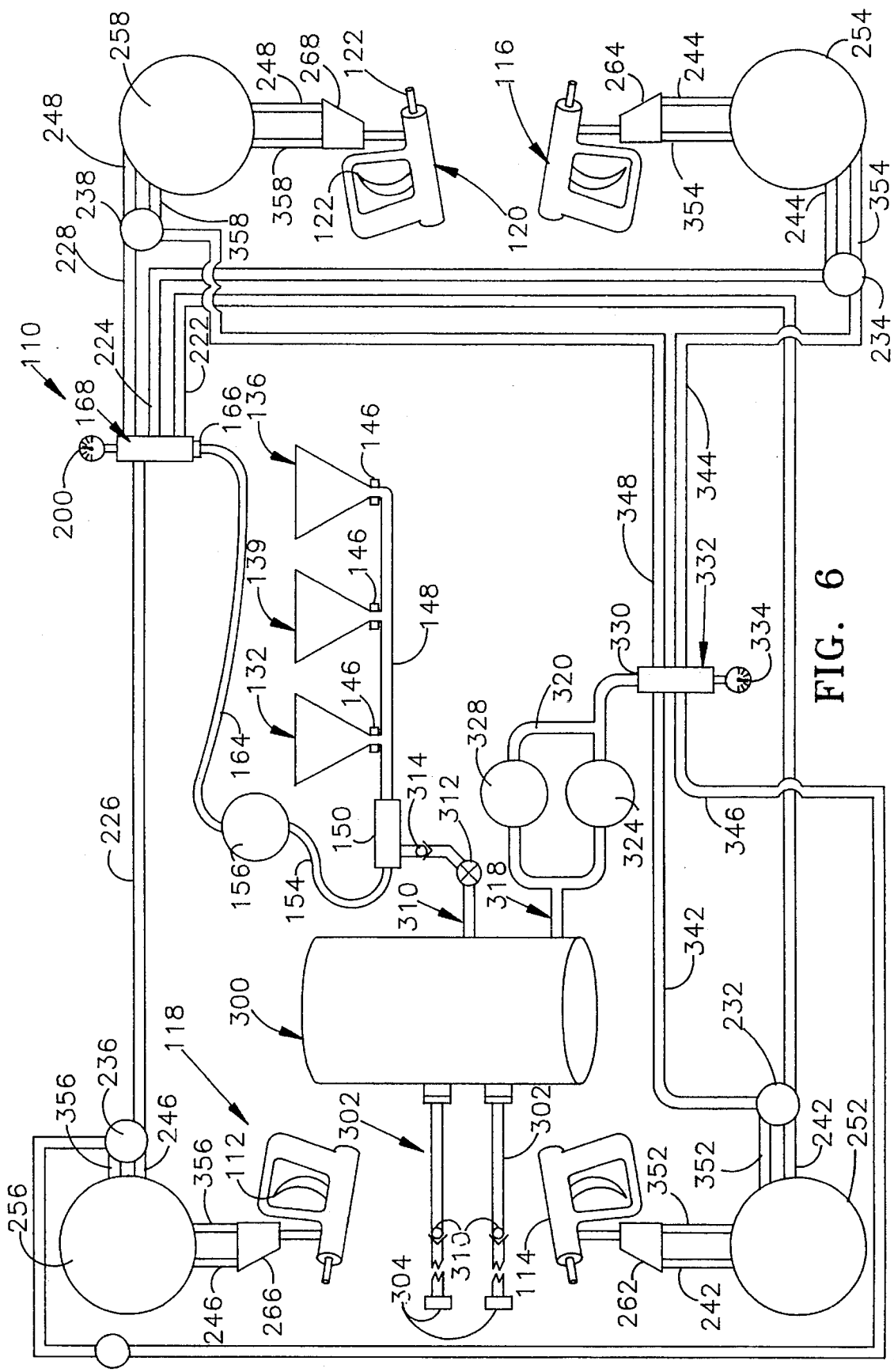
FIG. 6 is a schematic view of the fluid handling components of the aircraft cleaning apparatus of the present invention.
Figure 9:
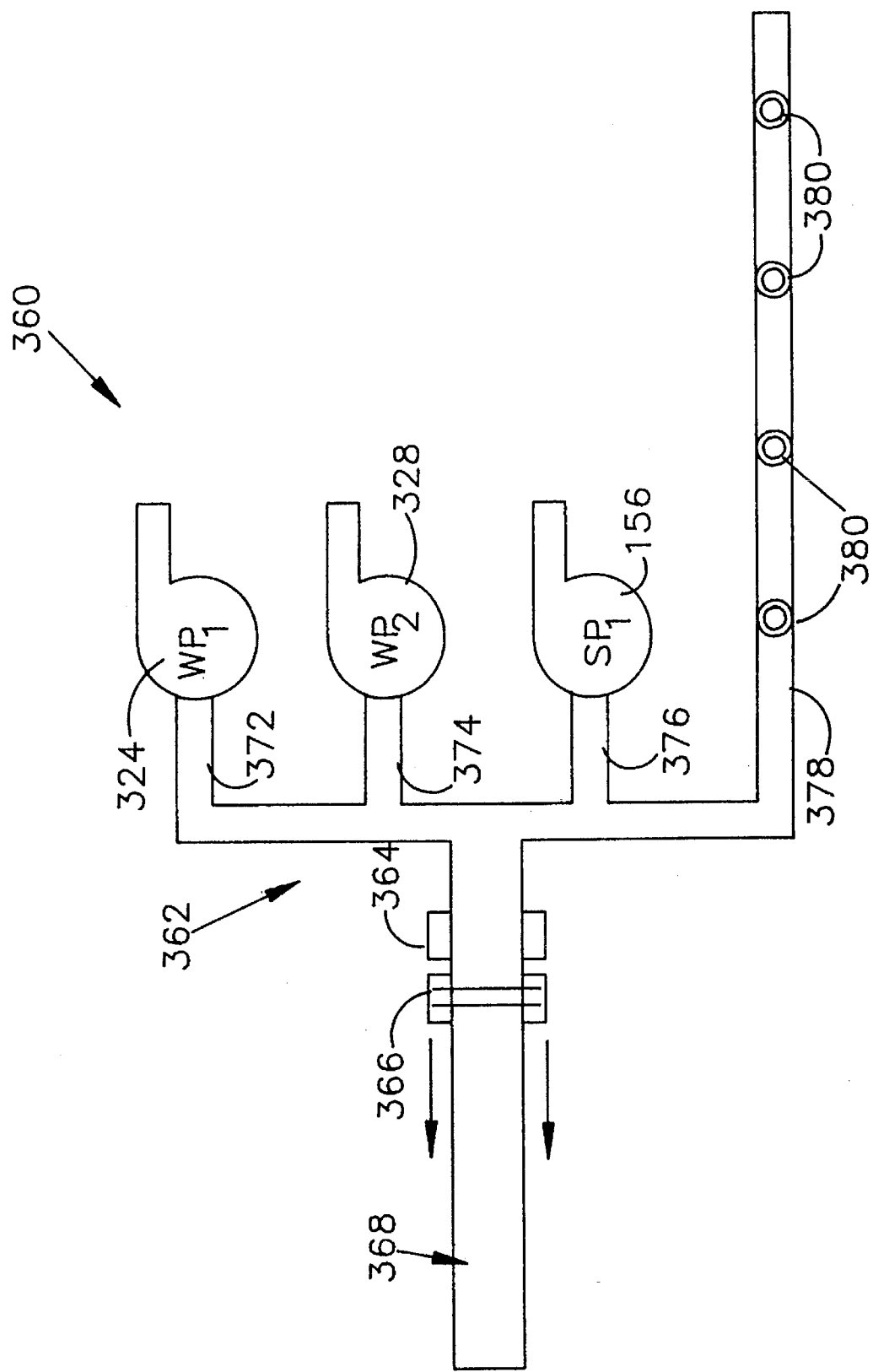
FIG. 9 is a schematic view of the pressurized air system of the present invention.

Turning now to FIGS. 6–8, the portable cleaning device 110 includes a plurality of user controlable dispensing devices for dispensing a cleaning fluid mixture to an item to be cleaned. In particular, the user controlable dispensing devices dispense a cleaning fluid mixture onto a surface of an aircraft in need of cleaning. The user controlable dispensing device include four separately controlable, separately operable user controlable dispensing devices 114, 116, 118, 120. Although the user controlable dispensing devices can take any form, it is prefered that the devices 114–120 have a pistol type grip handle so that the user can grip them securely, and a squeezeable trigger 122 for controlling the amount of fluid dispensed by the respective device 114–120. The end of the barrel portion of the dispensing device each includes a means for mounting a wand (e.g., 122) having a tip. Many types, sizes, shapes and tip configurations of wands can be used with each dispensing device 114–120. The type chosen will vary depending upon the type of surface to be cleaned and the spray pattern desired by the user. A typical cleaning device 110 would incorporate a large number of different shaped wands, which the user would interchange often during the course of cleaning an aircraft.

The portable cleaning device 110 includes a frame 124 upon which all of the components are mounted. Wheels 126 are provided for supporting the frame 124 above the ground, and facilitating the movement of the portable cleaning device 110. A tow bar 128 is coupled to the front end of the frame 124 to enable the portable cleaning device 110 to be towed by a tractor means (such as an airport baggage tractor) to the site of the aircraft being cleaned. The portability of the cleaning device 110 adds greatly to the efficiency, and efficacy of the device. For example, at a typical airline maintenance facility, the facility may include ten service bays, each of which house a particular airplane. As airplanes undergoing service are often difficult to move, it has been found by Applicant that the portability and transportability of the device 110 enables the device 110 to be moved between various service bays to clean the various aircraft in the different service bays. Additionally, the portable device 110 can be transported to an apron at the airport to clean aircraft parked outside the hangar base. This portability of the portable cleaning device 110 obviates the need for providing a separate hangar space devoted solely to cleaning an aircraft. Because of the limited real estate space available at an airport, eliminating the need for having a seaparate washing bay can provide a substantial cost savings to the airline or aircraft manufacturer using the portable cleaning device 110. The portable cleaning device 110 also includes a first fluid reservoir means for holding a first fluid, such as soap. The first fluid reservoir means comprises a plurality of tanks, such as first soap reservoir 132, second soap reservoir 134, and third soap reservoir 136. This plurality of soap reservoirs increases the storage capacity of the portable cleaning device 110. Each of the three soap reservoirs 132–136 are preferably constructed of 55 gallon plastic barrels, having a top opening, a threadedly engaged bunghole (not shown) into which the first fluid (e.g., the soap) can be dispensed from a soap storage tank (now shown)into the respective soap reservoirs 132–136.

Each of the soap reservoirs 132–136 are supported on the frame 124 by a tank support 140 having a plurality of concave recesses 141 that cradle and support the soap reservoirs 132–136.

As best illustrated schematically in FIG. 6, each of the soap reservoirs 132–136 includes a downwardly opening bunghole to which a coupling 146 can be attached for placing the soap reservoirs 132–136 in fluid communication with a first fluid tank delivery line 148. First fluid tank delivery line 148 is shown as being a common line which draws fluid from each of the three reservoirs 132–136. The first fluid tank delivery line 148 is preferably made from a PVC material, and has a diameter of approximately 1¼ inches. The first fluid tank delivery line 148 delivers soap from the soap reservoirs 132–136 to a soap tank 150. Soap tank 150 is preferably rectangular (mattress) shaped, and is made from a stainless steel material, and has a ¾ gallon capacity. The soap tank includes a two inch outflow pipe 154 which is threadedly engaged to a coresponding female inflow pipe on the soap pump 150.

The soap tank-to-pump delivery line 154, delivers the soap to a first fluid (soap) pump 156. As will be described in more detail below, soap pump 150 is prefereably pneumatically driven, and is capable of pumping the soap at a pressure of at least about 1000 PSI, and preferably at a pressure of between about 1200 PSI to 1400 PSI of the four soap delivery dispensers 114, 116, 118, 120. An example of a pump which will perform as a soap pump in the instant application is the stainless steel 20-1 King model pump manufactured by GRACO.

Soap pump 156 pumps the soap into a soap pump-to-manifold fluid delivery line 164. The soap pump-to-manifold fluid delivery line 164 is preferably made from high pressue flexible hose having swaged ends and has a diameter of approximately ¾ inches. The soap pump-to-manifold fluid delivery line 164 delivers the soap pumped by the soap pump 156 to an entry port 166 of a first manifold means 168.

The first manifold means 168 is best shown as comprising a generally cylindrical canister 174 having a generally disc-shaped bottom end cap 176. The bottom end cap 176 has a radially outer surface that can be welded, or otherwise securely attached to the radially inner surface of the generally cylindrical wall portion 182 of the generally cylindrical canister 174. The bottom end cap 176 also includes a radially inwardly facing threaded apperture that defines the entry port 168. The aperture of entry port 168 is threaded to receive a coupling (not shown) for coupling the soap pump-to-manifold delivery line 164 to the generally cylindrical canister 174.

The generally cylindrical wall portion 174 of the canister 174 is preferably about 8 inches high, and has a inner diameter of approximately 2¾ inches. The generally cylindrical wall 182 defines a generally hollow interior into which a filter means 183 can be placed for filtering the soap solution that passes through the manifold means 168. The generally cylindrical wall portion 182 includes a plurality of exit ports through which soap solution can exit the interior of the canister 174. The exit ports include a first exit port 186, and second exit port 188, and third exit port (not shown), and a fourth exit port 192. As best shown in FIG. 11, the cylindrical wall portion 194 is designed to have six potential exit ports. Three of the exit ports (e.g., exit ports 186, 188, 190) are disposed on one side of the cylindrical wall portion 182, and the other three exit ports (e.g., 187) are diametrally opposed from the first three exits ports and are placed on an opposite side of the cylindrical wall portion 182. As the invention only contemplates the need for four exit ports, the two additional ports are closed by plugs 215 that sealingly engage the unused exit ports.

The cylindrical wall portion 182 includes a pair of diametrally opposed threaded recesses 194, each of which is sized and positioned for receiving a threaded mounting bolt 195 for securely mounting the canister 174 onto a frame member (not shown) of the device 110. The canister 174 also includes a top end cap 196 having a threaded, radially outwardly facing surface 197 on its lower portion, for threadedly engaging threads 199 formed on the radially inner surface of the upper end of the interior of the cylindrical wall portion 182.

The top end cap 196 also includes an axially extending threaded apperture 198 for receivng a pressure gauge 200 (FIG. 6) that enables the user to keep track of the fluid pressure within the canister 174. A spacer member 202 is insertable in the interior of the canister 174 under the top end cap 196 to maintain a proper spaced relation with the filter 183, and to maintain the filter 183 in its proper position within the interior of the canister 174. Preferably, spacer 202 is designed to not allow fluid to pass therethrough, so that all fluid within the interior of the canister 174 flows through filter 183.

As best shown in FIG. 11, filter 183 is generally cylindrical, and includes a generally cylindrical interior or upstream surface 206, and a generally cylindrical, radially outwardly facing exterior or upstream surface 208. The generally continuous upstream surface 206 defines an upstream passage between the entry port 168 and the upstream surface 206 of the filter. The downstream surface 208 defines a downstream passage within the interior of the cylindrical wall portion 182 between the exit ports 186–190 and the exterior surface 208.

The filter 183 is designed to be removed at regular intervals from the interior of the cylindrical wall portion 182, so that it can be replaced easily when it becomes clogged. An example of a filter that will perform well with the present invention is a stainless steel 100 mesh type filter.

The filter, canister, entry port 168 and exit ports 186–190 are configured so that soap fluid enters through the entry port 186 into the upstream passage 212, and then flows radially outwardly through the filter 183 into the downstream passage 214. The soap fluid then continues to flow radially outwardly through all of the exit ports 186–190.

A first line set means is provided for delivering soap from the first manifold 168 to the four user controlable delivery devices 114–118. The first line set includes a first soap delivery line 222 which extends between the first exit port 186 of the manifold 168 and a first rotary collar coupling 232; a second soap delivery line 224 which extends between the second exit port 188 of the manifold 168 and a second rotary collar coupling 234; and third soap delivery line 226 that extends between the third exit port 187 of the manifold 168 and a third rotary collar coupling 236; and fourth soap delivery line 228 which extends between the fourth exit port 190 of the manifold 168 and a fourth rotary coupling collar 238. The four soap delivery lines 222–228 are preferably made from stainless steel tubing having a diameter of approximately ½ inches. Suitable coupling members are provided at each end of the lines for coupling the respective lines 222–228 at one end to the manifold 168, and at the other to the rotary couplings 232–238. At the respective rotary couplings 232–238, the soap delivery lines 222–228 are coupled to flexible soap hoses 242–248, which are partially carried by four separate rotatable spindles 252–258.

The flexible hoses include a first flexible soap hose 242 which is coupled between the first rotary collar 232 and a first mixing valve 262; a second flexible soap hose 244 which is coupled between the second rotary collar 234 and a second mixing valve 264; a third flexible soap hose 246 which is coupled between the third rotary collar 236 and a third mixing valve 266; and a fourth flexible soap hose 248 which is coupled between the fourth rotary coupling 238 and a fourth mixing valve 268.

Perferably, each of the flexible soap hoses are comprised of a hose material that is capable of withstanding the high pressures at which the soap is pumped through the apparatus (typically greater than 1000 PSI). Further, the hoses should have a diameter sufficient to carry appropriate volumes of soap, which are typically in the range of 1 to 2 gallons per minute. Additionally, the flexible soap hoses 242–248 should be long enough so that they can be unwound from their respective spindles 252–258, and extend far enough to enable the user to wash the appropriate parts of the aircraft. Due to the large wing span of many aircraft, it will be appreciated that a sizable length of hose is required. It has been found by Applicant that a twin type of hose, such as that manufactured by Synflex, having a length of about 100 feet, and an inner diameter of about ⅜ inches serves well when used in connection with the device 10.

The first through fourth rotatable spindles are mounted to the rotatable collars 232–238, respectively, so that the user can rotate the spindle to better feed the respective flexible hoses 242, 248 in the direction in which the user intends to take the flexible hoses 242–248. Conceptually, one can imagine the rotatable spindles 252–258 being mounted upon "lazy susans." Preferably, the "lazy susan" mechanism also includes a plurality of spaced, detent means, and a detent engaging means, that permits the spindle to be locked into any one of a large number of rotary positions.

Each of the respective flexible soap hoses 242–248 terminate at a mixing valve means, 262–268, respectively. The mixing valves 262–268, and their operation will be described in more detail below. For now, suffice it to say that the mixing valve 262 causes the soap solution contained within the soap hoses 242–248 to mix with the second cleaning fluid (usually water), and to then deliver the soap/water mix into the respective user controlable dispensing guns 114–120.

The delivery system for delivering the second fluid will now be described. Typically, the second cleaning fluid is water which is provided for diluting the soap solution, and for providing various rinse operations during the cleaning of the aircraft.

The water delivery system includes a second fluid reservoir means, here shown as a water reservoir 300. Water reservoir 300 is designed to contain approximately 55 gallons of water. In the drawings (FIG. 7), water reservoir 300 is shown as being generally barrel shaped. However, the Applicant has found that water reservoir 300 is preferably somewhat "mattress" shaped, and placed beneath the soap reservoirs.

A pair of water input lines 302 are provided for delivering water from a water source (not shown) to the water reservoir. A water input coupling 304 is coupled to the end of each of the water input lines 302 for receiving a water source conveyance means, such as a hose. Because of the large volumes of water that are typically required to clean an aircraft, it has been found by the Applicant that is better to provide water from a non-depletable water source, such as a tap, than to try to carry a sufficient quantity of water onboard the device 110. Typically, the water input lines 302 are ¾ inches in diameter, so that they can carry a sufficient amount of water so that during the operation of the deivce 10, the water being delivered into the reservoir 300 is at least equal to the water being drained from the reservoir 300 through use of the four water dispensing devices 114–120. A check valve 310 is placed in each water input line 302, to prevent water from back-flowing out of the water reservoir 300, into the water source.

A second water delivery line 310 extends between the water reservoir 300 and the soap tank 150. A user controlable valve 312 is provided for controlling the flow of water from the reservoir 300 to the tank 150, and a check valve 314 is provided for preventing soap within the tank 150 from flowing back into the water reservoir 300, and thereby contaminating the water within the reservoir 300.

This second water delivery line 310 is provided so that the water in the reservoir can help to dilute the soap flowing through the soap delivery system. This feature has the advantage of enabling a more concentrated soap to be contained within the soap reservoirs 132–136 to thereby stretch the amount of time that can go between refilling the soap tanks 132–136. Additionally, the introduction of water into the soap 150 helps to improve the flow characteristics of the soap through the soap delivery system.

A first water delivery line system is provided for delivering water from the reservoir 300, to the first and second water pumps 324, 328, and ultimately to the entry port 330 of a water distribution manifold 332.

The water delivery line means includes a T-shaped first portion 318 which delivers water from the reservoir 200 to each of the first and second water pumps 324, 328, from a single outlet on the reservoir 300. As is shown in the drawings, the first and second pumps 324, 328 operate in parallel. The water delivery line also includes a second or downstream portion 320 which delivers water from a downstream side of the first and second pumps 324, 328 to a single entry port 330 on the manifold distributor 332.

The first and second water pumps are preferably a pneumatically driven, and are capable, together, of pumping the water at a pressure of greater than about 1500 PSI, and preferably 2000 PSI, to each of the four water dispensing devices 114–120, at a rate of about 14.2 gallons per minute. Examples of pumps that will serve as the first and second water pumps 324, 328 are 20:1 King model pumps manufactured by GRACO.

The second (water) manifold distributor 332 is generally similar in size and configuration to the soap manifold 168. It includes an entry port 330 at its bottom, and six potential exit ports which extend through the side cylindrical wall. As with the first manifold distributor 168, second manifold distributor 332 uses only four of the available six exit ports, with the other two being plugged. A pressure gauge 334 is attached to the top cap member (not shown) of the manifold 332, so that the user can monitor manifold pressure.

Four water delivery lines are coupled to the four exit ports of the manifold distributor 332, for delivering water from the manifold distributor 332 to the rotary collars 232–238. The water delivery lines include a first water delivery line 342 for delivering water to the first rotary collar 232; a second water delivery line 344 for delivering water to the second rotary collar 234; and third water delivery line 346 for delivering water to the third rotary collar 236; and a fourth water delivery line 348 for delivering water to the fourth rotary collar 238.

First 352, second 354, third 356, and fourth 358 flexible water delivery hoses are coupled respectively, between the first through fourth rotary collars 232–238 and the respective first through fourth mixing valves 262–268. The flexible water delivery hoses 352–358 are generally similar in type, length, inner diameter, and pressure holding capacity to the respective first through fourth soap flexible delivery hoses 242–248. As will be explained in more detail below, water delivered from the first flexible delivery hoses 352–358 is mixed with soap in the mixing valves 262–268, and is then delivered to the fluid dispensing devices 114–120, wherein the water/soap mixture can then be applied to the surface to be cleaned.

As discussed above, many of the working members of the cleaning apparatus, such as the pumps 156, 324, 308 are pneumatically driven. An air schematic which illustrates the manner in which air is delivered to these respective tools is best described in connection with FIG. 9.

The air delivery system 360 includes an air manifold 362 for delivering high pressure air to several locations, and operating tools such as first and second water pumps 324, 328, and soap pump 156. The air manifold 362 includes a receptor collar valve 364 which is normally biased to be in the closed position. The receptor collar valve 364 is matable with an air hose valve 366 which is coupled to a source of high pressure air, such as air line 368.

The air hose valve 366 and receptor collar valve 364 should be of a type which are both normally biased to be closed, and which are kept in the closed position unless the receptor collar valve 364 and air hose valve 366 are properly mated. Additionally, the valves 364, 366 should be of a type wherein they can not be respectively either engaged, or disengaged, if the valves 364, 366 are not in their closed position. By enabling the valves to only be coupled when they are in their closed positions, potential injuries can be avoided due to the air hose 368 traveling out of control, as likely would happen if disengaged while under pressure.

Figure 12:
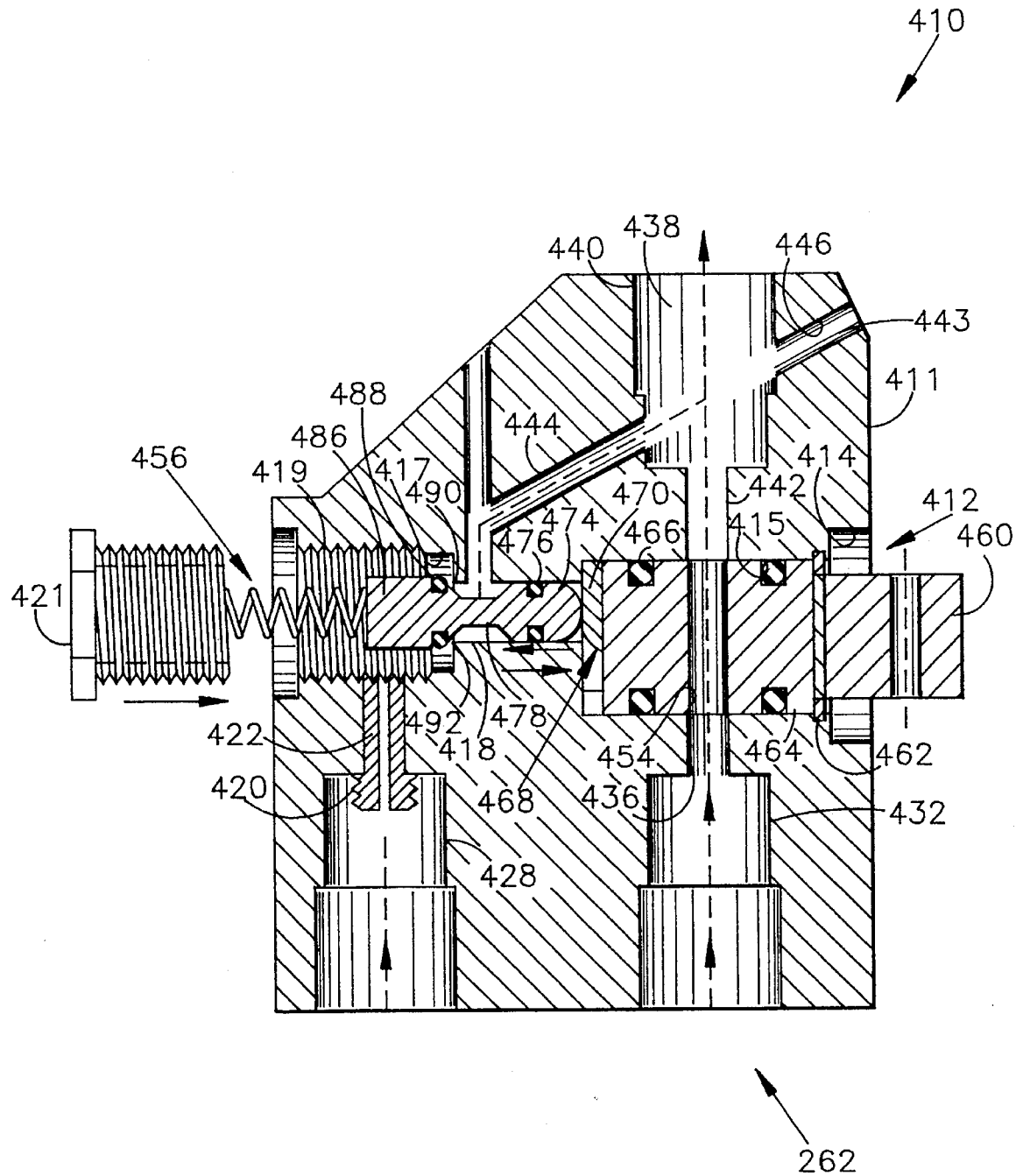
FIG. 12 is a section view of an alternate embodiment mixing valve of the present invention.

An alternate embodiment mixing valve, such as first mixing valve 262 is best shown with reference to FIG. 12.

An alternate embodiment valve 262 is best shown in FIG. 12 as including a valve body 410 that defines a first bore 412 therethrough. First bore 412 has a countersunk portion 414 adjacent the top surface 411 of the body, a proximal portion 415 disposed adjacent the countersunk portion 414, a distal portion 417 disposed adjacent the bottom surface 413 of the body 410, and a middle portion 418 disposed between the proximal portion 415 and the distal portion 417. The distal portion 417 also includes a threaded radially inwardly facing surface 419 for receiving a plug 421. The proxmial portion 415, distal portion 417 and middle portion 418 of the first bore 412 all are shown as having different diameters. The proximal portion 415 has the largest diameter. The distal portion 417 has a relatively reduced diameter (when compared to the proximal portion 415), but also a relatively enlarged diameter (when compared to the middle portion 418). Preferably, the diameter of the proximal portion is approximately ⅝ inches, the diameter of the distal portion 417 is approximately ½ inches, and the diameter of the middle portion 418 is approximately ⁵⁄₁₆ inches. As will be described in more detail below, various valve members of the mixing valve 262 are disposed within the various portions 415, 417, 418 of the first bore 412.

Body 410 further defines a first inlet passage 428 having a threaded portion at one end for connecting to soap delivery hose 242 (FIG. 6). At the opposite end of the first inlet passage 428, body 410 defines a second threaded passage for receiving a complementarily threaded flow restricting device 420. The threaded passage is open to bore 412 via a passage disposed generally perpendicular to bore 412.

Flow restricting device 420 has a threaded portion and a flow restricting bore 422 disposed therethrough for reducing the flow rate of fluid from inlet passage 428. In one embodiment, flow restricting device 420 is a screw made from, for example 316 stainless steel, and has a torques-type head with a bore 422 approximately 0.052 inches in diameter extending axially from the center of the torques receptacle to the end of the screw.

Body 410 also defines a second inlet passage 432 having a threaded portion at one end for connecting to a water delivery hose 352 (FIG. 6). The opposite end of the second inlet passage 432 is open to bore 412 via a passage 436, that is disposed generally perpendicular to first bore 412. In one embodiment, the first and second inlet passages 428 and 432 are sized for receiving a complementarily threaded 0.375 inch soap/water delivery hose. Although not shown, passage 436 can be configured for accepting a flow restrictor device similar to flow restricting device 20.

Body 410 further defines an outlet passage 438 having a threaded radially inner surface for connecting, in one embodiment, to a 0.375 inch complementarily threaded pipe on the user controllable dispensing device 114. Outlet passage 438 is open to bore 412 via third passage 442. Third passage 492 is disposed generally perpendicular to first bore 412 and is directly opposite to and facing second inlet passage 436. Third passage 442 is further open to first bore 412 via a fourth passage 444 that includes a portion disposed at an acute angle relative to the longitudinal axis of first bore 412 and to the axis of outlet passage 438. Third passage 442 is also open to passage 446 which is a continuance of fourth passage 444 toward the top surfae 412 of body 410. Passage 446 is non-functional with respect to the operation of valve 262 and exists only to provide a path for drilling fourth passage 444 during the manufacture of body 410. In fact, after fourth passage 444 is formed, passage 446 is typically closed at opening 48 by welding or any other equivalent method of forming leak-proof seal.

Body 410 is preferably of uniform construction and made from, for example, a material such as 304 stainless steel.

The valve for controlling the flow of fluid through the mixing valve 262 is disposed within the first bore 412. The valve means includes a second valve member 450 which is rotatably movable, and a first valve member 452 which is axially movable. A biasing means, such as a spring 456, is provided for biasing the first valve member 452 toward the second valve member 450.

The second valve member 450 includes an exteriorly disposed handle portion 460 at one end which the user can rotate to adjust the rotational position of the second valve member 450. A ring member 462 is fitted in a circumfrential groove formed in the distal portion 415 of the first bore 412, and maintains the second valve member 450 within the distal portion 415 of the first bore 412. The second valve member 450 also includes a first O-ring 464 which resides in a first circumfrential groove formed on the radially outwardly facing surface of the second valve member 450, and a second O-ring 466 which resides in a second circumfrential groove formed on the radially outwardly facing surface of the second valve member 450. It will be noticed that the first O-ring 464 is disposed generally distally of the second inlet passage 436 and third passage 442, and that the second O-ring 466 is disposed generally proximally of the second inlet passage 436 and third passage 442. The O-rings 464, 466 help to maintain fluid flowing from the second inlet passage 436 to the third outlet passage 442 between the O-rings to keep the valve from leaking.

A generally radially extending bore 454 extends through the second valve member 450, and is disposed generally perpendicular to the longitudinal axis of the second valve member 450. The size, position and function of bore 454 is generally very similar to the size, function and position of bore 454 formed in the valve means shown in FIG. 1. By rotating the second valve member 450, the user can rotate the bore 454 into and out of axial alignment with the second inlet passage 436 and third passage 442 to control the amount of second fluid (water) which is allowed to pass from the second inlet passage 436 to the third passage 442.

The second valve member 450 also includes an axially inwardly facing camming surface 468 which includes a relatively recessed portion and a relatively raised ramp portion 470. The camming surface 468 is provided for axially moving the first valve member 452.

The first valve member 452 includes a generally convex-shaped head 474 which is engageable with the camming surface 468 of the second valve member 450. The first valve member 452 also includes a first O-ring 476 which resides in a circumfrential groove formed on its radially outer surface, and a reduced diameter portion 478 which is disposed at the same general longitudinal position as the opening of fourth passage 444. The reduced diameter portion 478 helps to provide a flow path for fluid flowing from the first inlet 428, and into the fourth passage 444. The first valve member 452 also includes an enlarged diameter portion 486 which is disposed primarily in the distal portion 417 of the first bore 412. A conical valve seat engaging portion 490 of the first valve member 452 is disposed between the reduced diameter portion 478 and the enlarged diameter portion 486, and is provided for engaging a valve seat 492 which is formed at the point where the relatively reduced diameter middle portion 418 of the first bore 412 meets the relatively enlarged diameter distal portion 417 of the first bore 412.

The spring 456, includes a first end which is nested in a hollow, axially opening interior of the plug 421, and a second end which rests against the distal end of the first valve member 452. The biasing means 456 urges the first valve member 452 toward the second valve member 450.

Valve 262 is similar to valve system 5 as the valve 262 is adjustable to permit the proportion of the mixture to be in the range of between about zero percent (0%) of the first cleaning fluid, and one hundred percent (100%) of the second cleaning fluid; and about one hundred percent (100%) of the first cleaning fluid, and about zero percent (0%) of the second cleaning fluid. It will be appreciated that these ranges will likely never result in a situation where one hundred percent (100%) soap is passing through the valve, due to the fact that water is introduced into the soap mixture through the second reservoir delivery line 310, which permits water to flow from the second reservoir 300 to the soap tank 150.

In operation, the user adjusts the device to obtain the proper mixture of first cleaning fluid (the soap) and the second cleaning fluid (the water).

Assuming first that the user wishes to "soap up" the part being washed, wherein the user wants to spray a highly concentrated soap solution on the aircraft part which is almost devoid of water, the user would do the following.

First the user would rotate the handle 460 of the second valve member 450 to a position where the transverse bore 454 was a far out of axial alignment with the second inlet passage 436 and third passage 442 as possible. When so positioned, the camming surface 468 would have its ramp portion 470 disposed adjacent the convex head 474 of the first valve member 452, as shown in FIG. 12. The engagement of the ramp 470 with the convex head 474 would urge the first valve member 452 in a generally distal direction against the direction in which the first valve member 452 was being urged by spring 456. This would cause the conical valve seat engaging portion 490 to become disengaged from valve seat 492, thus creating an opening therebetween. This opening would provide a fluid flow path, wherein soap solution could flow through the first inlet 428, through the bore 422 of the flow restricting device, into the distal portion 417 of the first bore 412, through the space between the valve seat 492 and valve seat engaging portion 490, along side the reduced diameter portion 478 of the first valve member 452, and into the fourth passage 444. The soap solution would then flow through valve passage 444 and into the outlet passage 438, where it would ultimately flow into the dispensing device 114. If any water solution were to be travelling through the third passage 442, the soap solution 444 travelling through fourth passage would mix in the outlet passage 438 with the water solution 442, flowing through the third passage.

As the user then rotated the handle 460, the first valve member 452 would move axially, in a proximal direction, to reduce the gap between the valve seat engaging portion 490 and valve seat 492, thus reducing the flow of soap solution into the fourth passage 444. Simultaneously, the bore 454 of the second valve member 450 would move further into axial alignment with the second inlet passage 436 and third passage 442, to permit a greater quantity of water to flow into the outlet passage 438. It will be appreciated that this type of movement would cause the solution emerging from the outlet passage 438 to become less concentrated with soap solution, and more concentrated with water.

When the valve handle 460 was rotated to its extreme "water only" position, the transverse bore 454 would be in complete axial alignment with the second inlet passage 436 and third passage 442 to provide a relatively unrestricted flow of water between the second inlet passage 436 and the third passage 442. Simultaneously, the camming surface will have rotated to a point wherein the convex head 474 of the first valve member 452 engages the relatively recessed portion of the camming surface 468. At that point, the spring 456 would be able to urge the first valve member into a position wherein the valve engaging portion 490 engaged the valve seat 492, thus substantially, or perhaps completely, preventing the flow of soap solution from the first inlet passage 428 into the fourth passage 444. At such time, the solution emerging from the outlet passage 438 would be almost completely, if not completely, pure water. This pure water could then be used to rinse the aircraft part being cleaned.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A portable cleaning device for dispensing at least a first cleaning fluid and a second cleaning fluid comprising
    (a) at least two user controllable fluid dispensing devices;
    (b) a frame means;
    (c) a first fluid reservoir means supported by the frame means for holding the first cleaning fluid;
    (d) a first pump means for pumping first cleaning fluid from the first fluid reservoir means;
    (e) a first manifold means for receiving the first cleaning fluid from the first pump means, the first manifold means including at least one entry port, and at least two exit ports;
    (f) a first line set means for delivering the first cleaning fluid from the exit ports of the first manifold means to each of the at least two user controllable fluid dispensing devices;
    (g) a second fluid reservoir means for holding the second cleaning fluid;
    (h) a second pump means for pumping the second cleaning fluid from the second fluid reservoir means;
    (i) a second manifold means for receiving the second cleaning fluid from the second pump means, the second manifold means including at least one entry port and at least two exit ports;
    (j) a second line set means for delivering the second cleaning fluid from the exit ports of the second manifold means to each of the two user controllable fluid dispensing devices;
    wherein the at least two user controllable dispensing devices include a mixing valve means for receiving at least one line from each of the first and second line sets, and permitting the user to controllably adjust the relative volumes of the first and second cleaning fluids dispensed by the controllable dispensing devices.

2. The device of claim 1 wherein the frame means includes a plurality of wheels for supporting the frame means above the ground, and a tow bar means for coupling the frame means to a tractor means.

3. The device of claim 1 further comprising an air manifold means including an airline coupling means for receiving a source of high pressure air, and an air distribution means for distributing the high pressure air to at least one of the first and second pump means.

4. The device of claim 3 wherein the air manifold means includes an air tool coupling means to which an air driven tool can be attached, and wherein the air distribution means delivers air to each of the first and second pump means.

5. The device of claim 1 further comprising a first fluid tank means, and a first fluid tank delivery line means for delivering the first cleaning fluid from the first fluid reservoir means to the first fluid tank.

6. The device of claim 5 further comprising a second, first fluid tank delivery line means coupled between the second fluid reservoir means and the first fluid tank means for delivering second cleaning fluid to first fluid tank means.

7. The device of claim 6 wherein second, first fluid tank delivery line means includes a valve means for controlling the flow of second cleaning fluid and a check valve means for preventing the flow of the first cleaning fluid from the first fluid tank means to the second fluid reservoir means.

8. The device of claim 5 wherein the first fluid reservoir means comprises at least two first fluid reservoirs, and the fluid tank delivery means includes at least two couplings for coupling the at least two fluid reservoirs to the fluid tank delivery means.

9. The device of claim 8 wherein the first manifold means includes a filter means disposed between the entry port and the at least two exit ports.

10. The device of claim 9 wherein the first manifold means comprises a canister having a first wall on which the entry port is disposed, and a second wall on which the at least two exit ports are disposed, the filter means includes a generally continuous upstream surface defining an upstream fluid passage between the entry port and upstream surface, and a generally continuous downstream surface defining a downstream passage between the downstream surface and the at least two exit ports.

11. The device of claim 10 wherein the canister is generally cylindrically shaped, the filter means is generally cylindrically shaped, the first wall comprises an end wall of the canister, and the second wall comprises a side wall of the canister, wherein the first cleaning fluid flows generally radially outwardly from the upstream passage, through the filter means, and into the downstream passage.

12. The device of claim 1 wherein each of the first and second manifold means comprises a canister including a first wall having an entry port disposed thereon, and a second wall having at least two exit ports disposed thereon, the first and second walls defining a cavity, wherein each of the cansiter includes a filter means disposed in the respective cavities.

13. The device of claim 12 wherein each of the filter means includes a generally continuous upstream surface defining an upstream passage between the entry port and the upstream surface, and a generally continuous downstream surface defining a downstream passage between the downstream surface and the at least two exit ports.

14. The device of claim 13 wherein each of the canisters is generally cylindrically shaped, the filter means is generally cylindrically shaped, and the respective cleaning fluids flow generally radially outwardly from the upstream passage through the filter means, and into the downstream passage of at least one of the canister means.

15. The device of claim 1 wherein the second pump means comprises a first, second pump means and a second, second pump means operating in parallel.

16. The device of claim 15 further comprising a second fluid delivery line means for delivering the second cleaning fluid from the second fluid reservoir to the second manifold means, the second fluid delivery line means including a first portion for delivering the second cleaning fluid from the second reservoir means to each of the first and second, second pump means, and a second portion for delivering the second cleaning fluid from each of the first and second, second pump means to a single entry port of the second manifold means.

17. The device of claim 15 further comprising a second cleaning fluid input line means having an input line coupling for coupling the second cleaning fluid input line to a source of second cleaning fluid, the second cleaning fluid input line having sufficient capacity to receive enough second cleaning fluid to maintain the second reservoir means at a generally constant level during operation of the device.

18. The device of claim 17 wherein the first and second, second pump means are capable of pumping the second cleaning fluid at a pressure of at least about 1500 PSI, and the first pump means is capable of pumping the first cleaning fluid at a pressure of at least about 1000 PSI, to the at least two user controllable dispensing devices.

19. The device of claim 1 wherein the mixing valve means comprises
   (a) a valve body,
   (b) a first inlet passage defined in said valve body for receiving the first cleaning fluid,
   (c) a second inlet passage defined in said valve body for receiving the second cleaning fluid,
   (d) an outlet passage defined in said valve body for providing a proportional mixture of said first cleaning fluid and said second cleaning fluid,
   (e) valve means disposed within said body for directing said first cleaning fluid and said second cleaning fluid toward said outlet passage, said valve means being adjustable to vary said proportion of the first and second cleaning fluids in said mixture,
   (f) a third passage disposed between said valve and said outlet passage, said third passage being in fluid communication with said outlet passage; and
   (g) a fourth passage disposed between said valve and said third passage, said fourth passage directing said first fluid toward said third passage, and said third passage directing said first and second cleaning fluids toward said outlet opening.

20. In a portable cleaning device for dispensing at least a first cleaning fluid and a second cleaning fluid having at least one user controllable fluid dispensing device; a first fluid supply means for supplying a first cleaning fluid to the fluid dispensing device; and a second fluid supply means for supplying a second cleaning fluid to the fluid dispensing device,
   a mixing valve means disposed adjacent to the fluid dispensing device, the mixing valve means comprising:
   (a) a valve body;
   (b) a first inlet passage defined in the valve body for receiving the first cleaning fluid;
   (c) a second inlet passage defined in the valve body for receiving the second cleaning fluid;
   (d) an outlet passage defined in the valve body providing a proportional mixture of the first cleaning fluid and the second cleaning; and
   (e) a valve means disposed within the body for directing the first cleaning fluid and the second cleaning fluid toward the outlet passage where the first cleaning fluid and second cleaning fluid can mix before being dispensed by the user controllable fluid dispensing device, the valve means being adjustable to vary the proportion of the first and second cleaning fluids in the mixture.

21. The device of claim 20 wherein the mixing valve means includes:
   (a) a third passage disposed between the valve and the outlet passage, the third passage being in fluid communication with the outlet passage; and
   (b) a fourth passage disposed between said valve and the third passage, the fourth passage directing the first cleaning fluid toward the third passage, and the third passage directing the first and second cleaning fluids toward the outlet opening.

22. The device of claim 20 wherein the valve body includes a first bore extending generally therethrough, and the valve means includes
   (a) a generally cylindrical second valve member disposed within the first bore for directing the second cleaning fluid toward the outlet passage, the second valve member being rotatably adjustable; and
   (b) a first valve member disposed within the first bore for directing the first cleaning fluid,
wherein the rotatable movement of the second valve member adjusts the volume of the second cleaning fluid that is permitted to travel toward the outlet passage by the second valve member, and causes axial movement of the first valve member to adjust the volume of the first cleaning fluid that is permitted to travel toward the outlet passage.

23. The device of claim 22 wherein second valve member includes a cam surface for causing axial movement of the first valve member in response to rotational movement of the second valve member and a biasing means for biasing the first valve member toward the cam surface of the second valve member.

24. The device of claim 23 wherein the valve means is adjustable to permit the proportion of the mixture to be in the range of between about 0% of the first cleaning fluid, 100% of the second cleaning fluid, and about 100% of the first cleaning fluid and about 0% of second cleaning fluid.

25. A valve system for combining two liquids in varying proportions, the valve comprising
  (a) a valve body having a first bore disposed therethrough;
  (b) a first inlet passage defined in the valve body for receiving a first cleaning fluid;
  (c) a second inlet passage defined in the valve body for receiving a second cleaning fluid;
  (d) an outlet passage defined in the valve body for providing a proportional mixture of the first cleaning fluid and the second cleaning fluid;
  (e) a valve means for directing the first cleaning fluid and the second cleaning fluid toward the outlet passage, the valve means including
    (i) a generally cylindrical second valve member disposed within the first bore for directing the second cleaning fluid toward the outlet passage, the second valve member being rotatably adjustable;
    (ii) a first valve member disposed within the first bore for directing the first cleaning fluid;
  wherein the rotational movement of the second valve member adjusts the volume of the second cleaning fluid that is permitted to travel toward the outlet passage by the second valve member, and causes axial movement of the first valve member to adjust the volume of the first cleaning fluid that is permitted to travel toward the outlet passage.

26. The device of claim 25 wherein the second valve member includes a cam surface for causing axial movement of the first valve member in response to rotational movement of the second valve member, and a biasing means for biasing the first valve member toward the cam surface of the second valve member.

27. The device of claim 26 wherein the second valve member includes a generally radially extending passage therethrough, the radially extending passage being rotatably movable into and out of alignment with the second inlet passage for adjustably controlling the volume of second cleaning fluid.

28. The device of claim 27 wherein the first bore includes a proximal portion in which the second valve member is disposed, a distal portion having a relatively enlarged diameter in which the biasing means and a portion of the first valve means is disposed, and a middle portion having a relatively reduced diameter in which a portion of the first valve member is disposed.

29. The device of claim 28 wherein
  (a) the first inlet passage is in fluid communication with the distal portion to permit the first cleaning fluid to flow from the first inlet passage into the distal portion;
  (b) the distal portion includes a valve seat disposed generally at the intersection of the distal portion and middle portion; and
  (c) the middle portion is in fluid communication with the outlet portion to permit the first fluid to flow from the middle portion of the first bore to the outlet passage.

30. The device of claim 29 wherein the first valve member includes a relatively enlarged diameter portion disposed in the distal portion of the first bore, a reduced diameter portion disposed in the middle portion of the first bore, and a valve seat engaging portion of varying diameter disposed between the enlarged and reduced diameter portions for engaging the valve seat.

31. The device of claim 26 wherein the valve body defines an axially opening valve seat in the first bore, and the first valve member includes a valve seat engaging portion for engaging the valve seat, wherein the biasing means biases the valve seat engaging portion into engagement with the valve seat.

32. The device of claim 25 wherein the mixing valve means includes:
  (a) a third passage disposed between the second valve member and the outlet passage, the third passage being in fluid communication with the outlet passage; and
  (b) a fourth outlet passage disposed between the first valve member and the third passage, the fourth outlet passage directing the first cleaning fluid toward the third passage, and the third passage directing the first and second cleaning fluids toward the outlet opening.

33. A valve system for combining two liquids in varying proportions, said valve comprising:
  a valve body;
  a first inlet passage defined in said body for receiving a first fluid at a first predetermined pressure;
  a second inlet passage defined in said body for receiving a second fluid at a second predetermined pressure;
  an outlet passage defined in said body for providing a proportional mixture of said first fluid and said second fluid;
  valve means disposed within said body for directing said first fluid and said second fluid toward said outlet passage, said valve means being adjustable to permit said proportion of said mixture to be varied, in analog fashion;
  a third passage disposed between said valve and said outlet passage, said third passage being in fluid communication with said outlet passage; and
  a fourth passage disposed between said valve and said third passage, said fourth passage being in fluid communication with said third passage, said fourth passage directing said first fluid toward said third passage, and said third passage directing said first and second fluids toward said outlet passage, the fourth passage being disposed at a relatively acute angle to the third passage, and at a relatively obtuse angle to the outlet passage to foster the drawing of the first fluid into the outlet passage.

34. The valve system of claim 33 wherein said second fluid flowing in said third passage draws said first fluid from said fourth passage in venturi-like fashion to provide a mixture thereof to said outlet passage.

35. A valve system for combining two fluids in varying proportions, said valve comprising:
  a valve body having a first bore extending therethrough;
  a first inlet passage defined in said body for receiving a first fluid, said first inlet passage being in fluid communication with said first bore;
  a second inlet passage defined in said body for receiving a second fluid, said second inlet passage being in fluid communication with said first bore;
  an outlet passage defined in said body for providing a proportional mixture of said first fluid and said second fluid, said outlet passage being in fluid communication with said first bore;
  a generally cylindrical valve disposed within said first bore for directing said first fluid and said second fluid toward said outlet passage in varying proportions, said valve being rotatably adjustable within said first bore to permit variable proportions of said first and second fluids to flow through said outlet passage;

a third passage disposed between said valve and said outlet passage, said third passage being in fluid communication with said outlet passage; and a fourth passage disposed between said valve and said third passage, said fourth passage being in fluid communication with said third passage, said fourth passage directing said first fluid toward said third passage, and said third passage directing said first and second fluids toward said outlet passage, the fourth passage being disposed at a relatively acute angle to the third passage, and at a relatively obtuse angle to the outlet passage to foster the drawing of the first fluid into the outlet passage.

36. The valve system of claim 35 wherein said second fluid flowing in said third passage draws said first fluid from said fourth passage in venturi-like fashion to provide a mixture thereof to said outlet passage.

* * * * *